US012630059B2

(12) United States Patent
Kim et al.

(10) Patent No.: US 12,630,059 B2
(45) Date of Patent: May 19, 2026

(54) WALK-IN APPARATUS FOR VEHICLE SEAT

(71) Applicants:Hyundai Motor Company, Seoul (KR); Kia Corporation, Seoul (KR); Hyundai Transys Inc., Seosan (KR); DAS CO., LTD, Gyeongju (KR)

(72) Inventors: Mu Young Kim, Osan (KR); Jun Hwan Lee, Seoul (KR); Jun Young Heo, Gyeongju (KR); Ho Suk Jung, Hwaseong (KR); Hyeok Seung Lee, Seoul (KR); Keun Gwack, Ulsan (KR); Sang Do Park, Seoul (KR); Chan Ho Jung, Gunpo (KR); Jae Hun Jeong, Ulsan (KR); Sang Soo Lee, Hwaseong (KR); Sai Youn Jung, Suwon (KR); Seon Ho Park, Suwon (KR); Jun Hyuk Park, Yongin (KR); Jae Yong Jang, Suwon (KR); Jun Sik Hwang, Hwaseong (KR); Joong Geol Gug, Hwaseong (KR); Woo Ryang Kim, Hwaseong (KR); Jai Wha Choi, Suwon (KR); Gil Hwan Ryu, Yongin (KR); So Yun Kim, Suwon (KR)

(73) Assignees: Hyundai Motor Company, Seoul (KR); Kia Corporation, Seoul (KR); Hyundai Transys Inc., Seosan (KR); DAS CO., LTD, Gyeongju (KR)

( * ) Notice: Subject to any disclaimer, the term of this patent is extended or adjusted under 35 U.S.C. 154(b) by 218 days.

(21) Appl. No.: 18/372,557

(22) Filed: Sep. 25, 2023

(65) Prior Publication Data

US 2024/0336170 A1 Oct. 10, 2024

(30) Foreign Application Priority Data

Apr. 7, 2023 (KR) ......................... 10-2023-0045798

(51) Int. Cl.
B60N 2/08 (2006.01)
B60N 2/06 (2006.01)
(Continued)

(52) U.S. Cl.
CPC ................. B60N 2/20 (2013.01); B60N 2/06 (2013.01); B60N 2/08 (2013.01); B60N 2/0881 (2013.01); B60N 2/12 (2013.01)

(58) Field of Classification Search
CPC ... B60N 2/12; B60N 2/20; B60N 2/06; B60N 2/08; B60N 2/0818; B60N 2/0881; B60N 2/0727
See application file for complete search history.

(56) References Cited

U.S. PATENT DOCUMENTS

| | | | | |
|---|---|---|---|---|
| 6,048,030 A | * | 4/2000 | Kanda | B60N 2/123 297/341 |
| 7,017,993 B2 | * | 3/2006 | Niimi | B60N 2/12 297/341 |
| 9,227,528 B2 | * | 1/2016 | Yamada | B60N 2/0705 |

FOREIGN PATENT DOCUMENTS

KR 10-2013-0024625 A 3/2013

* cited by examiner

*Primary Examiner* — Syed A Islam
(74) *Attorney, Agent, or Firm* — Fox Rothschild LLP

(57) ABSTRACT

A walk-in apparatus for a vehicle seat includes a walk-in bracket rotatably coupled to a crossbar of a cushion frame and operable to release a fixing member by contacting the fixing member of a seat rail; a compensator bracket operably connected to the walk-in bracket through a hinge, the compensator bracket also being connected to a walk-in cable; and a compensator spring configured to support the walk-in bracket and the compensator bracket, rotate at least one of the walk-in bracket and the compensator bracket, and operate in such a manner as to return the compensator bracket. Even when the walk-in cable is released due to a (Continued)

seatback rebound phenomenon during a walk-in operation, the walk-in bracket maintains a pressing state of the fixing member to maintain continuously an unlocking state of the seat rail, allowing the vehicle seat to move forward smoothly to enable a walk-in operation.

16 Claims, 11 Drawing Sheets

(51) Int. Cl.
_B60N 2/20_                (2006.01)
_B60N 2/12_                (2006.01)

FIG. 3

WALK-IN APPARATUS FOR VEHICLE SEAT

CROSS REFERENCE TO RELATED APPLICATION

The present application claims under 35 U.S.C. § 119(a) the benefit of Korean Patent Application No. 10-2023-0045798 filed on Apr. 7, 2023, the entire contents of which are incorporated by reference herein.

BACKGROUND

(a) Technical Field

The present disclosure relates to a walk-in apparatus for a vehicle seat capable of sliding the vehicle seat forward.

(b) Description of the Related Art

In certain vehicles, such as larger SUVs, there may be up to three rows of seats. Typically, a first row of seats may encompass a driver seat and a passenger seat, and the vehicle (e.g., a recreational vehicle such as an SUV) may be equipped with a second row of seats, and in some cases, a third row of seats behind the second row of seats.

In this way, in the case of a vehicle equipped with a third row of seats, the second row of seats has a walk-in function enabling passengers seated in the third row of seats to enter and exit the vehicle more easily.

A walk-in function of a seat means that a seat located in a certain row, such as the second row of seats (where such a seat is also referred to as a "second row seat") is located at a rear of a seat rail, and in an initial state where a seatback is upright, when a passenger operates a walk-in operating mechanism (switch, bottom, lever), the seatback rotates forward and folds, and a walk-in cable may be pulled to unlock the seat rail when the seatback is folded. Thereafter, when the seat rail is unlocked, the second row seat slides forward to a set position along the seat rail with an elastic force of a spring. Through this, the walk-in function of the seat may provide sufficient space between the second and third row of seats.

Furthermore, when the passenger manipulates the walk-in operating mechanism for a walk-in operation of the seat, a locking of the seatback is released, and when the locking is released, the seatback rotates forward and folds with the elastic force of the spring. At this time, the seatback rotates in an opposite direction, which is upright again due to an impact rotating forward, that is, a seatback rebound phenomenon occurs, and due to the seatback rebound phenomenon, a pull of the walk-in cable is loosened, and the seat rail changes from an unlocked state to a locked state again. As a result, there are a problem that the seat cannot move forward to a desired position.

The matters described as the background art are for the purpose of enhancing the understanding of the background of the present disclosure and should not be taken as acknowledging that the matters correspond to the related art already known to those skilled in the art.

SUMMARY

The present disclosure relates to a walk-in apparatus for a vehicle seat that allows the vehicle seat to move forward smoothly to a desired position by continuously maintaining an unlocking state of a seat rail even when a seatback rebound phenomenon occurs during a walk-in operation, and as a result, it is possible to improve durability and vehicle quality. The walk-in apparatus for the vehicle seat of the present disclosure for achieving the above object includes a walk-in bracket, which is rotatably coupled to a crossbar of a cushion frame and operable to release a fixing member by contacting the fixing member of a seat rail; a compensator bracket operably connected to the walk-in bracket through a hinge, the compensator bracket also being connected to a walk-in cable; and a compensator spring configured to support the walk-in bracket and the compensator bracket, rotate at least one of the walk-in bracket and the compensator bracket, and operate in such a manner as to return the compensator bracket.

The compensator bracket may have one end connected to the walk-in bracket, and an opposite end connected to the walk-in cable.

The compensator spring may be configured to rotate the walk-in bracket and the compensator bracket integrally.

The compensator spring may be configured to rotate only the compensator bracket according to a pull and release of the walk-in cable.

A back frame may be rotatably coupled to the cushion frame, a walk-in probe bracket may be rotatably coupled to the cushion frame at a bottom of the back frame, and an opposite end of the walk-in cable may be connected to the walk-in probe bracket.

When the back frame is folded while rotating forward during the walk-in operating mechanism is operated, a lower end of the back frame may contact the walk-in probe bracket and may rotate the walk-in probe bracket, and when the walk-in probe bracket rotates, the walk-in cable may be pulled toward the walk-in probe bracket.

A pull force of the walk-in cable may be greater than an elastic force of the compensator spring.

When the back frame is folded while rotating forward with the walk-in operation, the compensator bracket and the walk-in bracket may rotate together around the crossbar by the pull force of the walk-in cable, and the walk-in bracket may press a fixing member of the seat rail. The compensator bracket and the walk-in bracket may rotate together by the pull force of the walk-in cable until a locking of the seat rail by the fixing member is released.

From the point of unlocking the fixing member, only the compensator bracket may rotate around a hinge by the pull force of the walk-in cable, and the walk-in bracket may be maintained a terminated rotation by the support of the fixing member. When the rotation of the compensator bracket is terminated, the forward rotation of the back frame may be terminated, and the seat rail may be maintained in the unlocking state as pressure of the fixing member by the walk-in bracket is maintained.

The back frame may occur a back frame rebound rotation that rotates at a predetermined angle backward due to an impact generated at the end of the forward rotation thereof, when the back frame rebound rotation occurs, the walk-in cable may be released in an opposite direction of a pulling direction. Due to the release of the walk-in cable, the compensator bracket rotates in a return direction with a compensator spring force, even after a return direction rotation of the compensator bracket is terminated, as pressure of the fixing member is maintained by the walk-in bracket, the seat rail may maintain continuously the unlocking state.

The compensator spring may operate to rotate the walk-in bracket and the compensator bracket together or only rotate the compensator bracket when the walk-in cable is pulled, and return the compensator bracket when the walk-in cable is released.

Furthermore, a walk-in apparatus for a vehicle seat includes a walk-in bracket, which is rotatably coupled to a cushion frame and operating to lock and release a fixing member by contacting a fixing member of a seat rail when rotating; a compensator bracket connected to the walk-in bracket through a hinge; a compensator spring with both ends thereof installed to support on the walk-in bracket and the compensator bracket; a walk-in probe bracket rotatably coupled to the cushion frame from a bottom of a back frame rotatably coupled to the cushion frame; and a walk-in cable with both ends thereof connected to the compensator bracket and the walk-in probe bracket.

A rotation of the walk-in probe bracket and a pull force of the walk-in cable may occur due to a forward rotation of the back frame during the walk-in operation, and the compensator bracket and the walk-in bracket may rotate together by the pull force of the walk-in cable and then as the wall-in bracket presses the fixing member of the seat rail, a locking of the seat rail is released and a seat moves forward along the seat rail with a spring force of a walk-in spring.

Only the compensator bracket may rotate around the hinge due to the pull force of the walk-in cable that has continued after the fixing member of the seat rail was released by the fixing member, and the walk-in bracket does not rotate in contact with the fixing member; when the back frame rebound rotation occurs at the end of a forward rotation of the back frame as the rotation of the compensator bracket terminates, the compensator bracket may return to the compensator spring force due to the release of the walk-in cable; as the pressure of the fixing member by the walk-in bracket is maintained even during the back frame rebound rotation, the seat rail may be kept maintained in an unlocked state.

According to the present disclosure, a vehicle may include the walk-in apparatus.

In the walk-in apparatus for the vehicle seat according to the present disclosure, even when the walk-in cable is released due to a seatback rebound phenomenon during walk-in operation, only the compensator bracket connected to the walk-in cable returns and rotates, the walk-in bracket maintains the fixing member pressurized, and then the seat rail maintains continuously the unlocking state. As a result, the vehicle seat is capable of the walk-in operation, and thus is able to move forward smoothly to a set position while continuously maintaining an unlocking state of a seat rail, thus improving durability and vehicle quality.

BRIEF DESCRIPTION OF THE DRAWINGS

FIG. 3 is an enlarged view of a portion of the vehicle seat where the walk-in apparatus is provided in FIG. 2.

DETAILED DESCRIPTION

Figure 1:
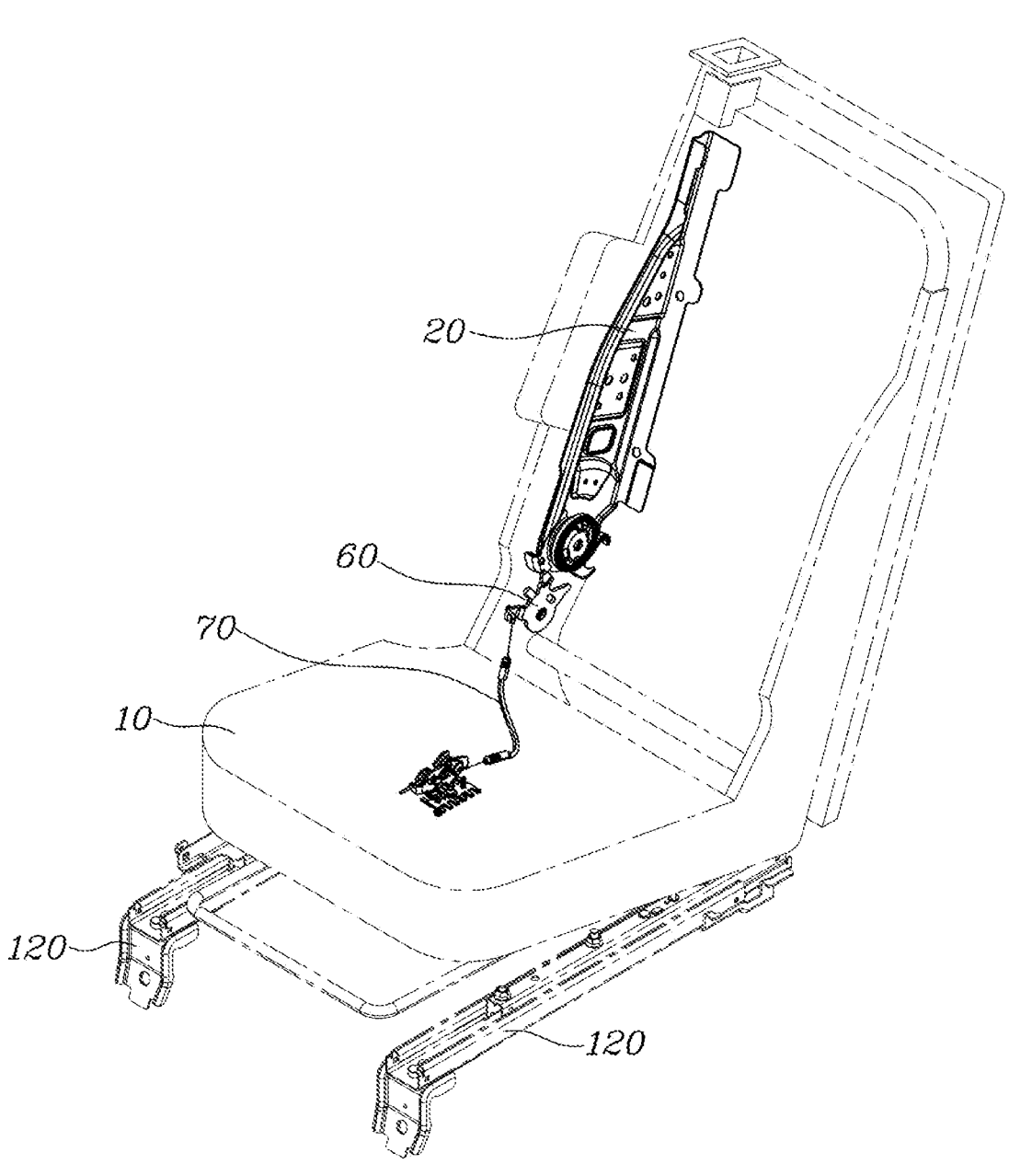
FIGS. 1 and 2 are perspective and side views, respectively, of a vehicle seat equipped with a walk-in apparatus according to the present disclosure.
Figure 2:
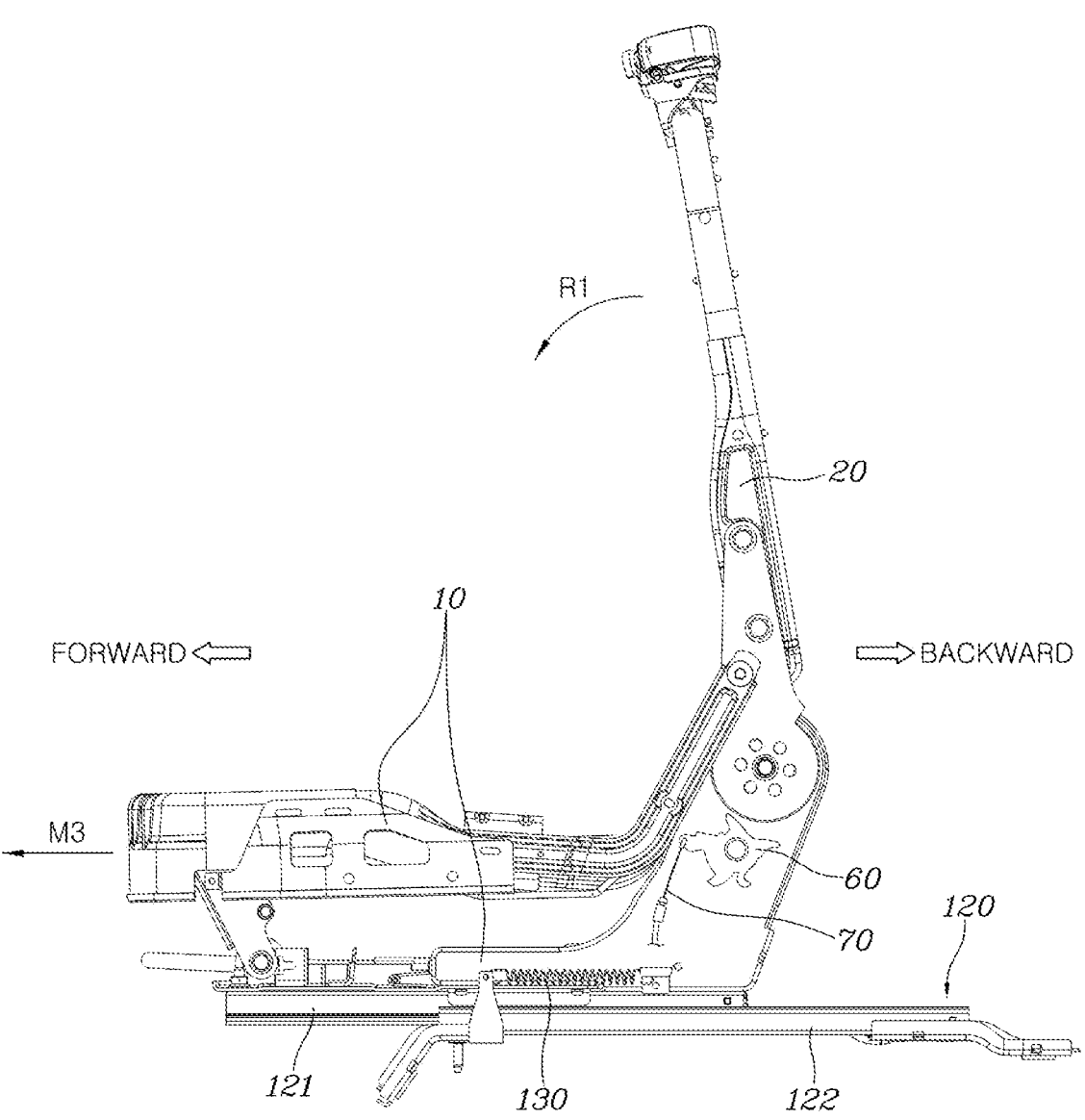
Figure 4:
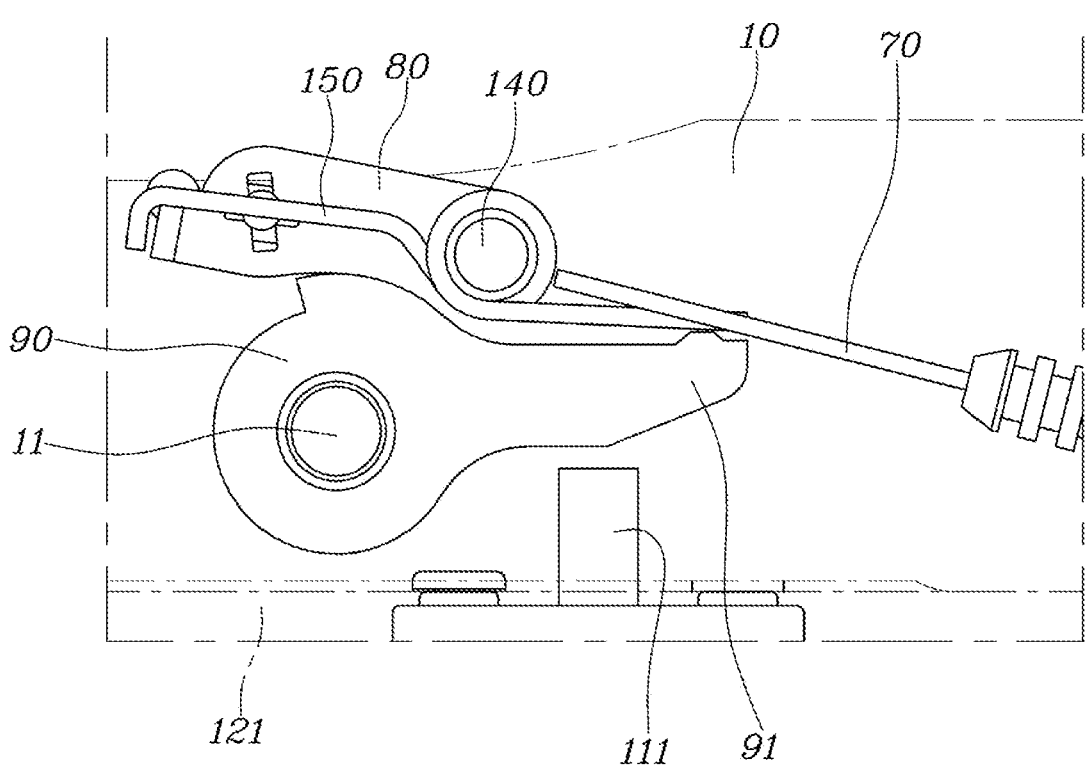
FIGS. 4 and 5 are enlarged views of portions of the vehicle seat in which a compensator bracket and a walk-in bracket according to the present disclosure are coupled.
Figure 5:
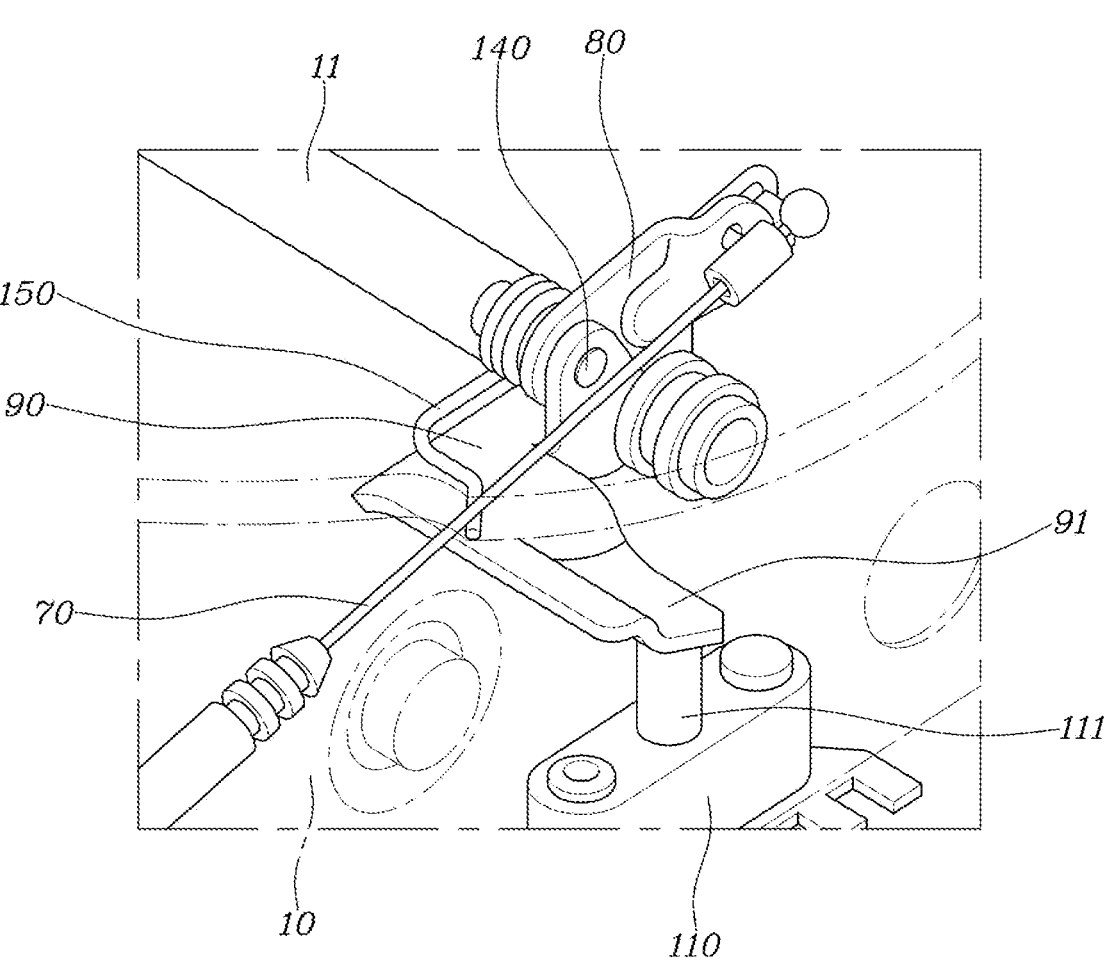

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments disclosed in the present specification will be described in detail with reference to the accompanying drawings. However, regardless of the reference character, the same or similar constituent elements shall be given the same reference number and the redundant descriptions thereof shall be omitted.

In describing the embodiments of the present specification, when a specific description of the related art is deemed to obscure the subject matter of the embodiments of the present specification, the detailed description will be omitted.

Furthermore, the accompanying drawings are intended to facilitate the understanding of the embodiments set forth in the present specification, and the technical idea of the present specification is not limited by the accompanying drawings. All alterations, equivalents, and substitutes that are included within the technical idea of the present disclosure should be understood as falling within the scope of the present disclosure.

The ordinal number terms first, second, and so on may be used to describe various constituent elements but should not limit these constituent elements. These terms are only used to distinguish one constituent element from another element It should be understood that a constituent element, when referred to as being "connected to" or "coupled to" a different constituent element, may be directly connected or directly coupled to the different constituent element or may be coupled or connected to the different constituent element with a third constituent element disposed therebetween.

In contrast, it should be understood that a constituent element, when referred to as being "directly coupled to" or "directly connected to" a different constituent element, is coupled or connected to the different constituent element without a third constituent element therebetween.

Furthermore, a unit or a control unit included in the name of a motor control unit (MCU), a hybrid control unit (HCU) or the like is a term widely used to name a controller that controls a specific function of a vehicle, and does not mean a general function unit.

A controller may include a communication device communicating with another control unit or sensor to control a function in charge, a memory which stores operating system or logic commands and input/output information, and one or more processors which make judgments, calculations, and decisions necessary for controlling the function in charge.

Hereinafter, a walk-in apparatus for a vehicle seat according to a preferred embodiment of the present disclosure will be described with reference to the accompanying drawings.

A seat of a vehicle equipped with a walk-in function according to the present disclosure is coupled to a structure in which a back frame 20 is rotatable to a cushion frame 10 as illustrated in FIGS. 1 to 7.

A connection portion between the cushion frame 10 and the back frame 20 may be equipped with a back frame locking mechanism 30 for restricting a rotation of the back frame 20, and a folding spring 40 for rotating and folding the back frame 20 forward with spring force.

For example, the back frame locking mechanism 30 may be a recliner, and the folding spring 40 may be composed of a spiral spring or a torsion spring.

The back frame locking mechanism 30 is connected to a walk-in operating mechanism 50, the walk-in operating mechanism 50 may be provided on an upper or side of the seatback in a second row seat, and for example, the walk-in operating mechanism 50 may be composed of either a walk-in switch, a button, or a lever.

Figure 3:
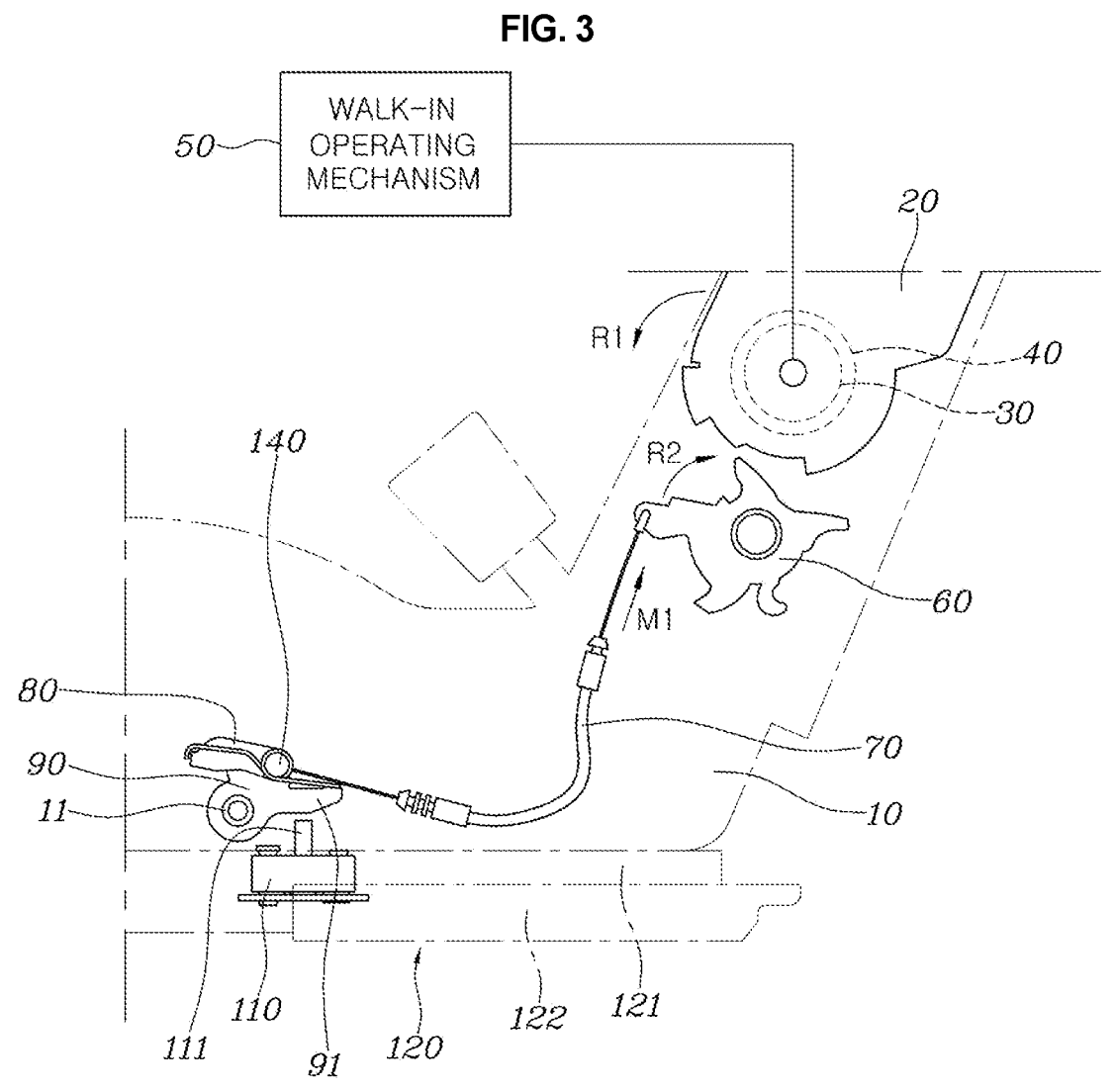

When a passenger operates the walk-in operating mechanism 50, a locking of the back frame locking mechanism 30 is released, and when a locking is released, the back frame 20 is rotated forward and folded by a spring force of the folding spring 40 (arrow R1 in FIG. 3).

A walk-in probe bracket 60 is rotatably coupled to the cushion frame 10 below a lower end of the back frame 20.

When the back frame 20 rotates forward and folds during a walk-in operation, the lower end of the back frame 20 contacts the walk-in probe bracket 60, which transmits a rotational force of the back frame 20 to the walk-in probe bracket 60, thereby the walk-in probe bracket 60 is rotated (arrow R2 in FIG. 3).

The walk-in probe bracket 60 is connected to a rear end of a walk-in cable 70, and a front end of the walk-in cable 70 is connected to a compensator bracket 80.

When the walk-in probe bracket 60 rotates due to the rotation of the back frame 20 during the walk-in operation, the walk-in cable 70 is pulled toward the walk-in probe bracket 60 to generate a pull force (arrow M1 in FIG. 3).

A crossbar 11 is provided in the cushion frame 10 separated forward from the walk-in probe bracket 60, and a walk-in bracket 90 is rotatably coupled to the crossbar 11 of the cushion frame 10.

The walk-in bracket 90 has a protrusion 91 protruding to one side, and the protrusion 91 of the walk-in bracket 90 is located above a fixing member 111 operably connected to a seat rail locking mechanism 110.

As provided herein, the fixing member 111 may be a locking pin or other fastener such as a peg, dowel, rivet, screw, bolt, nail, anchor, or any other attachment mechanism.

The seat rail locking mechanism 110 is provided on a moving rail 121 constituting a seat rail 120, and the moving rail 121 is connected to the cushion frame 10, and the moving rail 121 is coupled to a fixing rail 122 fixed to a vehicle body and moves forward and backward along the fixing rail 122.

Figure 6:
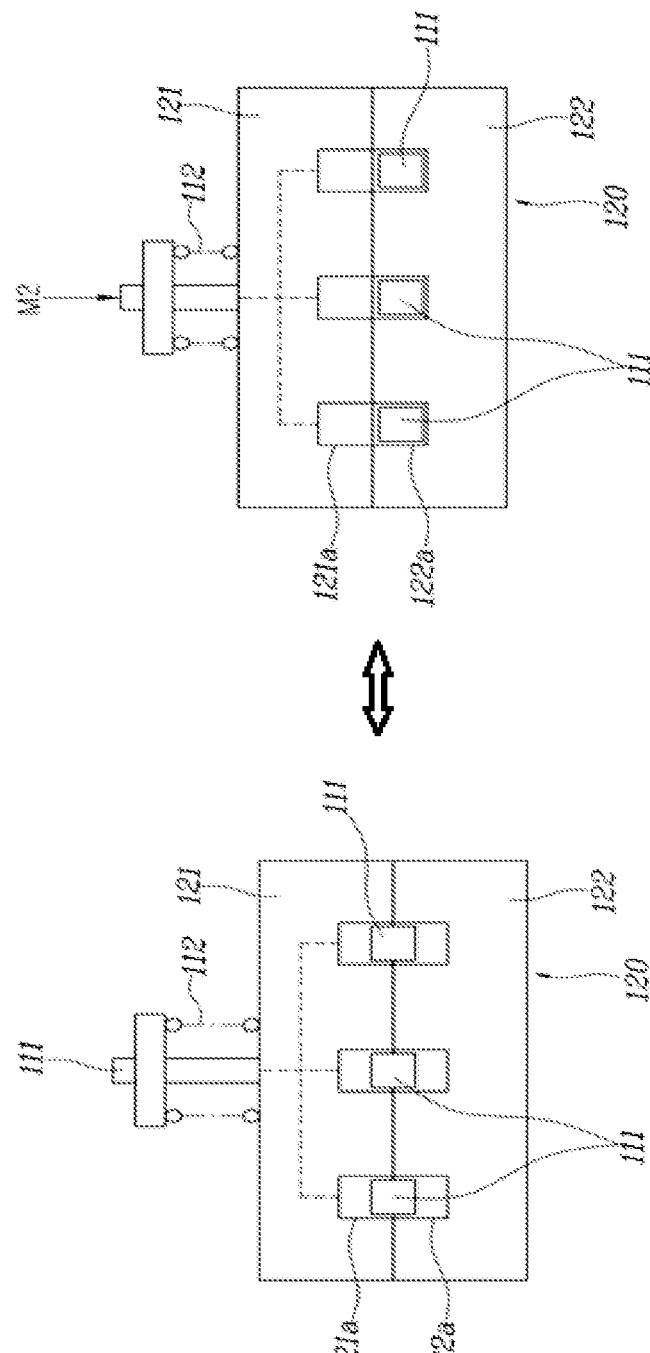
FIG. 6 is a view illustrating an operation of a fixing member according to the present disclosure.

As illustrated in FIG. 6, the fixing member 111 is inserted into windows 121a and 122a of the fixing rail 122 and the moving rail 121 at the same time to restrict a movement of the moving rail 121 on a regular basis. When an external force is applied to the fixing member 111 and the fixing member 111 descends (arrow M2), the fixing member 111 is located only in a window 122a of the fixing rail 122, and from this time, the fixing member 111 releases restriction of the moving rail 121.

Reference numeral 112 refers to a fixing member spring 112 for returning the fixing member 111.

When the walk-in bracket 90 rotates downward around the crossbar 11, the protrusion 91 of the walk-in bracket 90 contacts the fixing member 111 of the seat rail locking mechanism 110 and presses the fixing member 111, the fixing member 111 descends by a pressure of the protrusion 91 to release a locking of the seat rail 120.

When the fixing member 111 releases the locking of the seat rail 120, the cushion frame 10 slides forward along the seat rail 120 to a predetermined position with a spring force of a walk-in spring 130.

The compensator bracket 80 according to the present disclosure is located above the walk-in bracket 90, and the rear end of the compensator bracket 80 and the walk-in bracket 90 are connected through a hinge 140, the front end of the walk-in cable 70 is connected to the front end of the compensator bracket 80.

In addition, an embodiment according to the present disclosure includes a compensator spring 150 installed to support both ends of the walk-in bracket 90 and the compensator bracket 80, rotating the walk-in bracket 90 and the compensator bracket 80 integrally or rotating only the compensator bracket 80 when a pull of the walk-in cable 70, and operating in such a manner as to return the compensator bracket 80 when a release of the walk-in cable 70.

As the walk-in cable 70 is pulled toward the walk-in probe bracket 60 during the walk-in operation, when a pull force occurs, the compensator bracket 80 must be rotated by a pull force of the walk-in cable 70, and to this end, it would be desirable to set the pull force of the walk-in cable 70 greater than an elastic force of the compensator spring 150.

FIGS. 7 to 11 sequentially illustrate an operation process of a walk-in apparatus according to the present disclosure during the walk-in operation.

Figure 7:
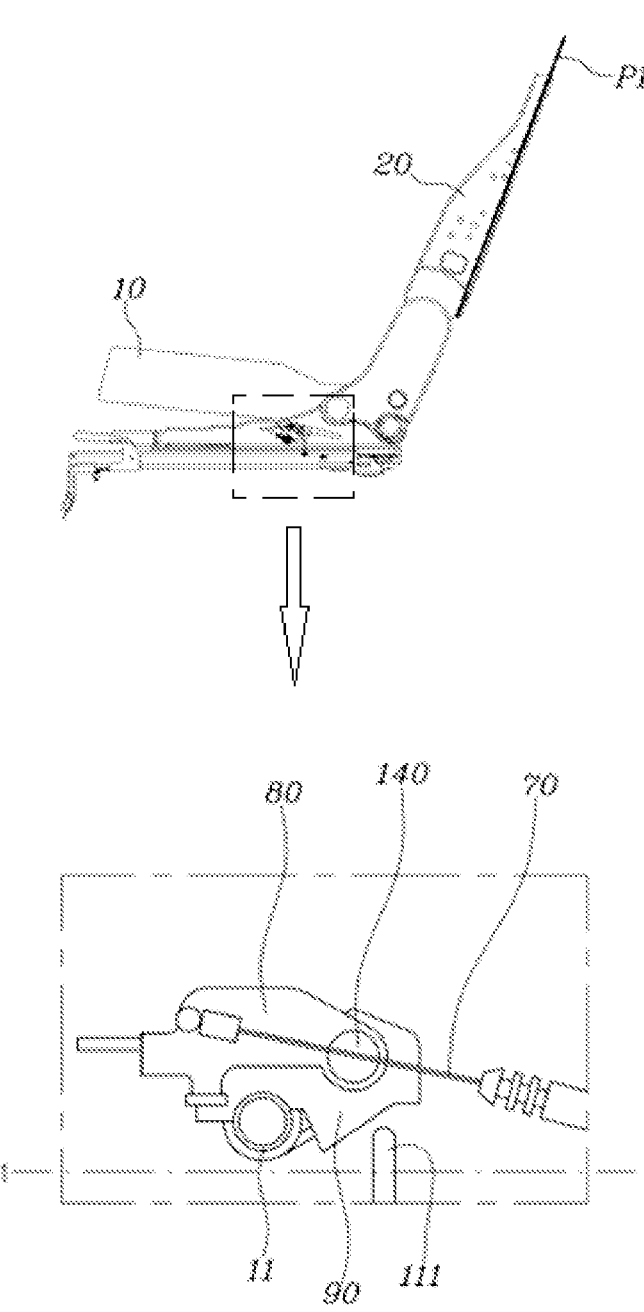
FIGS. 7 to 11 are views illustrating an operation process of the walk-in apparatus according to the present disclosure during a walk-in operation.

FIG. 7 depicts an initial state before the walk-in operation begins, and at this time, the back frame 20 is located in a stand standard position P1.

In the initial state as illustrated in FIG. 7, the walk-in bracket 90 does not rotate, so the walk-in bracket 90 does not press the fixing member 111. At this time, the fixing member 111 is protruded above the reference line L1 where an unlocking of the seat rail 120 begins, so the seat rail 120 is kept locked by the fixing member 111.

Figure 8:
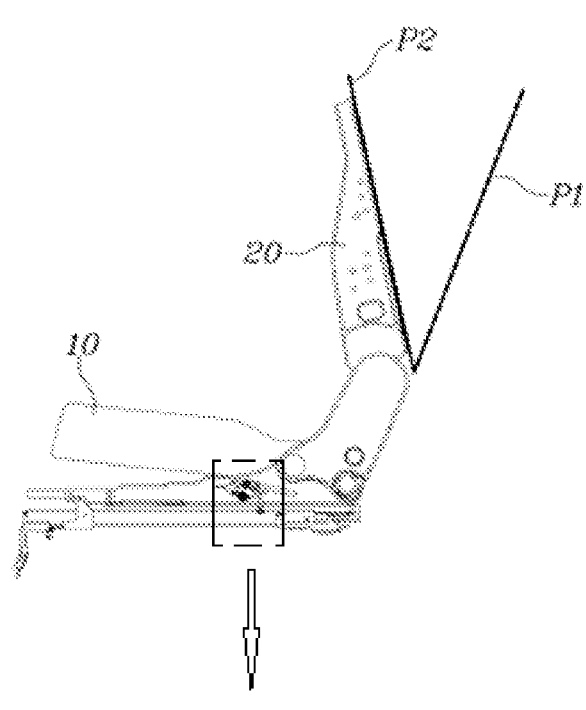
Figure 8:
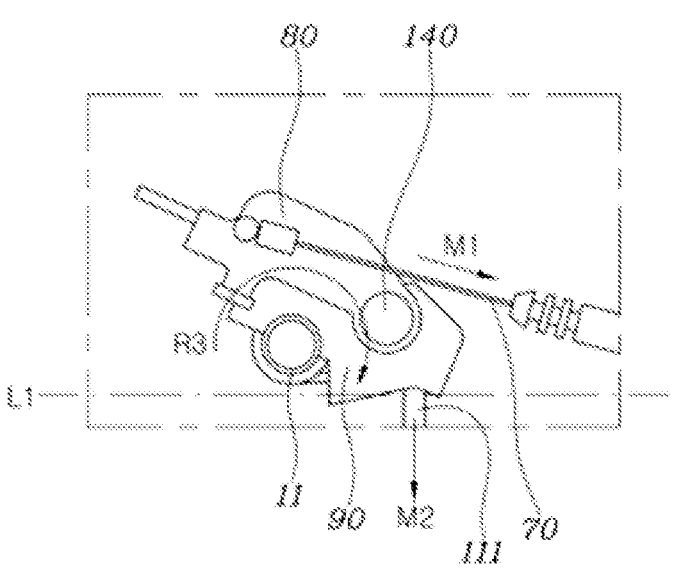

FIG. 8 depicts a primary operation state in which the walk-in operation has begun, and at this time, the back frame 20 is rotated forward from the standard position P1 and then is rotated to the primary position P2.

When a passenger manipulates the walk-in operating mechanism 50 in the initial state of FIG. 7, a locking of a back frame locking mechanism 30 is released, and the back frame 20 rotates forward and folds by a spring force of a folding spring 40 when the locking is released.

When the back frame 20 rotates forward, the lower end of the back frame 20 contacts the walk-in probe bracket 60 to rotate the walk-in probe bracket 60, and the walk-in cable 70 is pulled by the rotation of the walk-in probe bracket 60 to generate a pull force (arrow M1).

The compensator bracket 80 and the walk-in bracket 90 are connected through a hinge 140 by the pull force of the walk-in cable 70 to rotate around the crossbar 11 together (arrow R3), which causes the walk-in bracket 90 to press the fixing member 111.

The fixing member 111 pressed by the walk-in bracket 90 moves downward and is located below a reference line L1 where the unlocking of the seat rail 120 begins, from this point, the seat rail 120 becomes the unlocking state.

The compensator bracket 80 and the walk-in bracket 90 rotate together by the pull force of the walk-in cable 70 only until the fixing member 111 releases the locking of the seat rail 120.

Figure 9:
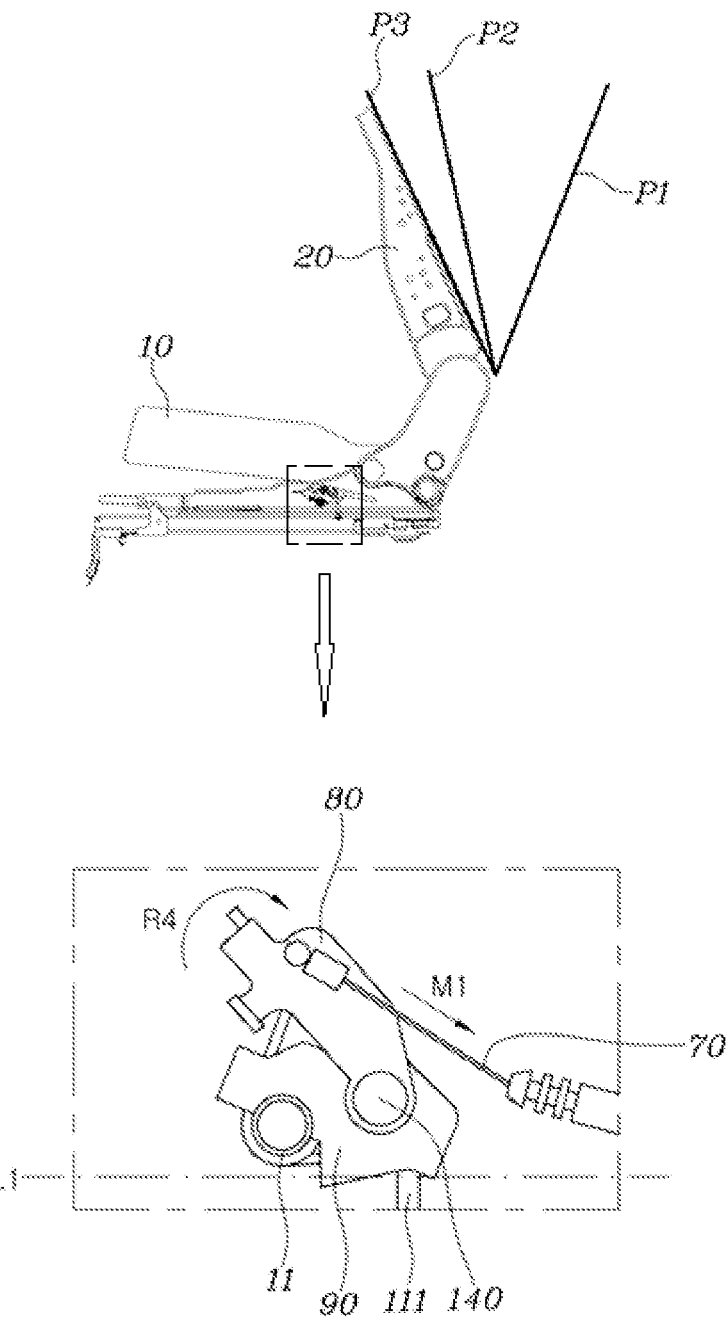

FIG. 9 depicts a walk-in secondary operation state, and at this time, the back frame 20 is rotated more forward from a primary position P2 to a secondary position P3.

When the pull force of the walk-in cable 70 continues to occur due to a continuous forward rotation of the back frame 20 in the primary operation state in which the locking of the seat rail 120 is released by the fixing member 111, only the compensator bracket 80 rotates around the hinge 140 (arrow R4), and the walk-in bracket 90 is kept maintained in a state in which rotation is terminated due to support by contact with the fixing member 111.

That is, only the compensator bracket 80 rotates around the hinge 140 by the pull force of the walk-in cable 70 in the secondary operation state of FIG. 9, and the walk-in bracket 90 does not rotate due to the support by the fixing member 111.

And, when a rotation of the compensator bracket 80 is terminated, a forward rotation of the back frame 20 also is terminated, even at this time, as pressing of the fixing member 111 by the walk-in bracket 90 is continuously maintained, the seat rail 120 maintains continuously the unlocking state.

Figure 10:
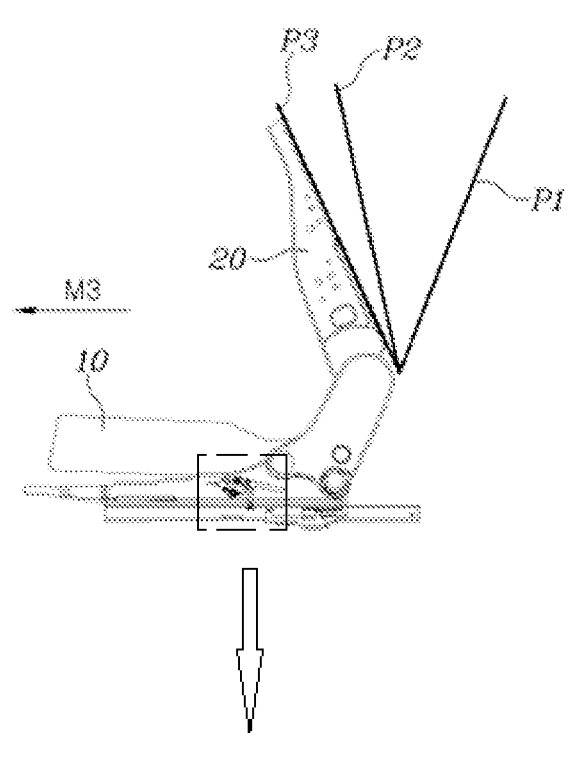
Figure 10:
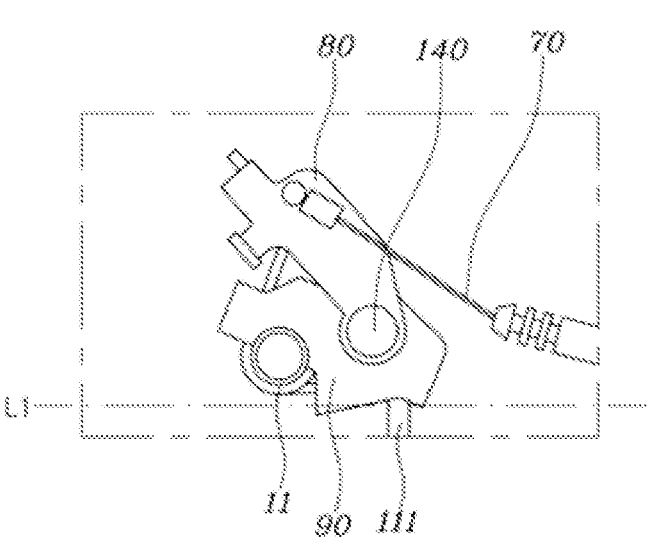

FIG. 10 depicts a state in which the cushion frame 10 slides forward by a spring force of the walk-in spring 130 after the secondary operation state and the walk-in operation is completed (arrow M3).

Even when the walk-in operation is completed as illustrated in FIG. 10, the compensator bracket 80 maintains continuously to rotate further around the hinge 140, and the walk-in bracket 90 also presses continuously the fixing member 111, so that the seat rail 120 maintains continuously the unlocking state.

Figure 11:
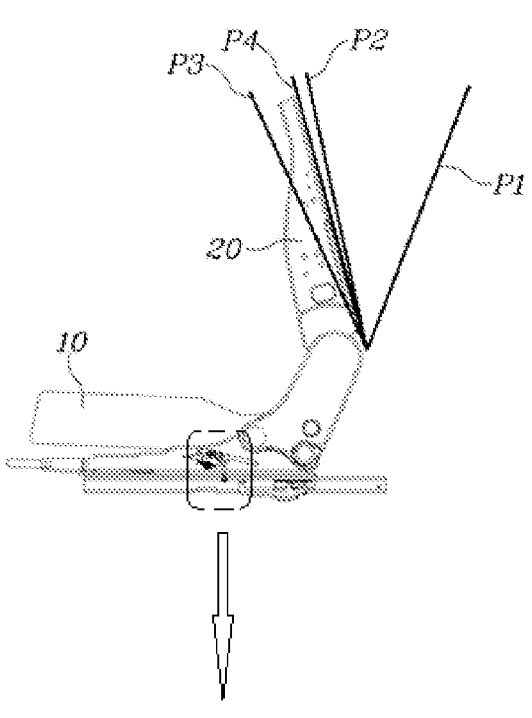
Figure 11:
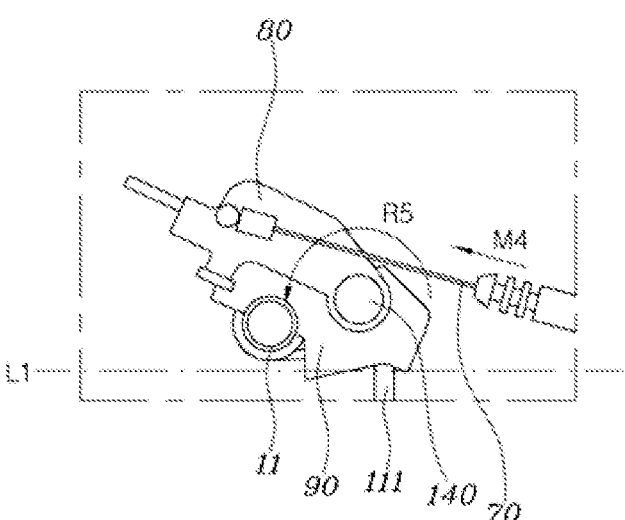

FIG. 11 illustrates that the back frame 20 is rotated back by a predetermined angle due to an impact generated when the back frame 20 rotates to the secondary position P3 with the spring force of the folding spring 40 and terminates the rotation, that is, the back frame rebound rotation has occurred.

When the back frame rebound rotation occurs as described above, the walk-in cable 70 is released in the opposite direction of the pulling direction (arrow M4), and the compensator bracket 80 rotates in the return direction with a force of a compensator spring 150 by the release of the walk-in cable 70 (arrow R5).

In the embodiment according to the present disclosure, as the walk-in bracket 90 continues to press the fixing member 111 even after a return direction rotation (arrow R5) of the compensator bracket 80 is terminated, an unlocking state of the seat rail 120 continues to be maintained, which enables the seat to perform the walk-in operation and thus move forward smoothly up to the set position.

As described above, in the walk-in apparatus for the vehicle seat according to the present disclosure, even when the walk-in cable 70 is released due to a seatback rebound phenomenon during the walk-in operation, only the compensator bracket 80 connected to the walk-in cable 70 returns and rotates, and the walk-in bracket 90 maintains the pressing state of the fixing member 111 to maintain the unlocking state of the seat rail 120. As a result, the seat can move forward smoothly to a set position while continuously maintaining an unlocking state of a seat rail, thereby improving durability and vehicle quality.

Although the specific exemplary embodiments of the present disclosure have been shown and described, it will be apparent to those skilled in the art that the present disclosure may be variously improved and changed without departing from the technical spirit of the present disclosure provided by the appended claims.

What is claimed is:

1. A walk-in apparatus for a vehicle seat, the walk-in apparatus comprising:
   a walk-in bracket, which is rotatably coupled to a first hinge configured in a cushion frame and operable to release a fixing member by contacting the fixing member of a seat rail;
   a compensator bracket operably connected to a second hinge configured in the walk-in bracket, the compensator bracket also being connected to a walk-in cable; and
   a compensator spring configured to support the walk-in bracket and the compensator bracket, rotate one or more of the walk-in bracket or the compensator bracket, and operate in such a manner as to return the compensator bracket.

2. The walk-in apparatus of claim 1, wherein the compensator bracket has one end connected to the walk-in bracket, and an opposite end connected to the walk-in cable.

3. The walk-in apparatus of claim 1, wherein the compensator spring is configured to rotate the walk-in bracket and the compensator bracket integrally.

4. The walk-in apparatus of claim 1, wherein the compensator spring is configured to rotate only the compensator bracket according to a pull and release of the walk-in cable.

5. The walk-in apparatus of claim 1, wherein:
   a back frame is rotatably coupled to the cushion frame,
   a walk-in probe bracket is rotatably coupled to the cushion frame at a bottom of the back frame, and
   an opposite end of the walk-in cable is connected to the walk-in probe bracket.

6. The walk-in apparatus of claim 5, wherein:
   when the back frame is folded while rotating forward during a walk-in operating mechanism is operated, a lower end of the back frame contacts the walk-in probe bracket and rotates the walk-in probe bracket, and
   when the walk-in probe bracket rotates, the walk-in cable is pulled toward the walk-in probe bracket.

7. The walk-in apparatus of claim 1, wherein a pull force of the walk-in cable is greater than an elastic force of the compensator spring.

8. The walk-in apparatus of claim 5, wherein:

when the back frame is folded while rotating forward with a walk-in operation, the compensator bracket and the walk-in bracket rotate together around the crossbar by the pull force of the walk-in cable, and the walk-in bracket presses the fixing member of the seat rail, and the compensator bracket and the walk-in bracket rotate together by the pull force of the walk-in cable until a locking of the seat rail by the fixing member is released.

9. The walk-in apparatus of claim 8, wherein:

from the point of unlocking of the fixing member, only the compensator bracket rotates around the second hinge by the pull force of the walk-in cable, and the walk-in bracket is kept maintained a terminated rotation by the support of the fixing member, and when the rotation of the compensator bracket is terminated, the forward rotation of the back frame is terminated, and the seat rail is maintained in an unlocking state as a pressure of the fixing member by the walk-in bracket is maintained.

10. The walk-in apparatus of claim 9, wherein:

the back frame occurs a back frame rebound rotation that rotates at a predetermined angle backward due to an impact generated at the end of the forward rotation thereof, when the back frame rebound rotation occurs, the walk-in cable is released in an opposite direction of a pulling direction, due to the release of the walk-in cable, the compensator bracket rotates in a return direction with a compensator spring force, and even after a return direction rotation of the compensator bracket is terminated, as the pressure of the fixing member is maintained by the walk-in bracket, the seat rail continues to maintain the unlocking state.

11. The walk-in apparatus of claim 1, wherein the compensator spring operates to rotate the walk-in bracket and the compensator bracket together or only rotate the compensator bracket when the walk-in cable is pulled, and return the compensator bracket when the walk-in cable is released.

12. A walk-in apparatus for a vehicle seat, comprising:

a walk-in bracket, which is rotatably coupled to a first hinge configured in a cushion frame and operates to lock and release a fixing member by contacting the fixing member of a seat rail when rotating;

a compensator bracket operably connected to the walk-in bracket through a second hinge configured in the walk-in bracket;

a compensator spring with both ends thereof installed to support on the walk-in bracket and the compensator bracket;

a walk-in probe bracket rotatably coupled to the cushion frame from a bottom of a back frame rotatably coupled to the cushion frame; and a walk-in cable with both ends thereof connected to the compensator bracket and the walk-in probe bracket.

13. The walk-in apparatus of claim 12, wherein:

a rotation of the walk-in probe bracket and a pull force of the walk-in cable occur due to a forward rotation of the back frame during a walk-in operation, and the compensator bracket and the walk-in bracket rotate together by the pull force of the walk-in cable and then as the wall-in bracket presses the fixing member of the seat rail, a locking of the seat rail is released and a seat moves forward along the seat rail with a spring force of a walk-in spring.

14. The walk-in apparatus of claim 13, wherein:

only the compensator bracket rotates around the second hinge due to the pull force of the walk-in cable that has continued after the fixing member of the seat rail was released by the fixing member, and the walk-in bracket does not rotate in contact with the fixing member, when the back frame rebound rotation occurs at the end of a forward rotation of the back frame as the rotation of the compensator bracket terminates, the compensator bracket returns to the compensator spring force due to the release of the walk-in cable, and as a pressure of the fixing member by the walk-in bracket is maintained even during the back frame rebound rotation, the seat rail is kept maintained in an unlocked state.

15. A vehicle comprising the walk-in apparatus of claim 1.

16. A vehicle comprising the walk-in apparatus of claim 12.

\* \* \* \* \*